(12) United States Patent
York

(10) Patent No.: US 10,473,847 B2
(45) Date of Patent: Nov. 12, 2019

(54) ILLUMINATION DEVICE HAVING A LIGHT GUIDE WITH LEAKY SIDE SURFACES

(71) Applicant: Quarkstar LLC, Las Vegas, NV (US)

(72) Inventor: Allan Brent York, Langley (CA)

(73) Assignee: Quarkstar LLC, Las Vegas, NV (US)

( * ) Notice: Subject to any disclaimer, the term of this patent is extended or adjusted under 35 U.S.C. 154(b) by 752 days.

(21) Appl. No.: 14/905,744

(22) PCT Filed: Jul. 18, 2014

(86) PCT No.: PCT/US2014/047279
§ 371 (c)(1),
(2) Date: Jan. 15, 2016

(87) PCT Pub. No.: WO2015/010076
PCT Pub. Date: Jan. 22, 2015

(65) Prior Publication Data
US 2016/0161656 A1    Jun. 9, 2016

Related U.S. Application Data

(60) Provisional application No. 61/856,009, filed on Jul. 18, 2013.

(51) Int. Cl.
*F21V 8/00*      (2006.01)
*F21Y 115/10*    (2016.01)
(Continued)

(52) U.S. Cl.
CPC .............. *G02B 6/0073* (2013.01); *F21S 8/04* (2013.01); *F21V 7/0016* (2013.01);
(Continued)

(58) Field of Classification Search
CPC .................................. F21S 8/04; G02B 6/0073
(Continued)

(56) References Cited

U.S. PATENT DOCUMENTS

| 4,432,039 A | 2/1984 | Cibie |
| 4,435,743 A * | 3/1984 | Plumly ................ G02B 6/0083 362/184 |

(Continued)

FOREIGN PATENT DOCUMENTS

| DE | 102011090197 A1 | 7/2013 |
| DE | 102012107437 A1 | 6/2014 |

(Continued)

OTHER PUBLICATIONS

European Application No. 14752461.5, Communication pursuant to Article 94(3) EPC, dated Apr. 25, 2017, 6 pages.

(Continued)

*Primary Examiner* — Robert J May
*Assistant Examiner* — Leah Simone Macchiarolo
(74) *Attorney, Agent, or Firm* — Fish & Richardson P.C.

(57) ABSTRACT

An illumination device includes one or more light-emitting elements (LEEs) arranged to provide light; a light guide includes a receiving end and an opposing end, the receiving end being arranged to receive the light provided by the LEEs. The light guide further includes a pair of opposing side surfaces extending along a length of the light guide between the receiving and opposing ends. The light guide is configured to guide the received light in a forward direction, along the length of the light guide toward the opposing end, and transmit a first portion of the guided light into ambient through one or more of the opposing side surfaces as sideways leaked light. The illumination device further includes an extractor located at the opposing end and configured to output into the ambient a remaining portion of the guided light—that reaches the opposing end—as output light in backward directions.

8 Claims, 9 Drawing Sheets

(51) Int. Cl.
*F21S 8/04* (2006.01)
*F21V 7/00* (2006.01)
*F21Y 103/10* (2016.01)
*F21Y 101/00* (2016.01)

(52) U.S. Cl.
CPC ............ *F21V 7/0091* (2013.01); *G02B 6/002* (2013.01); *G02B 6/0006* (2013.01); *G02B 6/0008* (2013.01); *G02B 6/0023* (2013.01); *G02B 6/0031* (2013.01); *G02B 6/0035* (2013.01); *G02B 6/0036* (2013.01); *G02B 6/0045* (2013.01); *G02B 6/0051* (2013.01); *G02B 6/0055* (2013.01); *G02B 6/0068* (2013.01); *G02B 6/0076* (2013.01); *G02B 6/0085* (2013.01); *F21Y 2101/00* (2013.01); *F21Y 2103/10* (2016.08); *F21Y 2115/10* (2016.08)

(58) Field of Classification Search
USPC .......................................... 40/546, 553, 570
See application file for complete search history.

(56) References Cited

U.S. PATENT DOCUMENTS

| | | | |
|---|---|---|---|
| 5,764,828 | A | 6/1998 | Iga et al. |
| 6,014,192 | A | 1/2000 | Lehureau et al. |
| 6,273,577 | B1 | 8/2001 | Goto |
| 6,910,783 | B2 | 6/2005 | Mezei et al. |
| 9,081,125 | B2 | 7/2015 | Dau et al. |
| 9,228,702 | B2 | 1/2016 | Welten |
| 9,715,056 | B1 * | 7/2017 | Wegner ................ G02B 3/0006 |
| 9,798,070 | B2 * | 10/2017 | Van Bommel ........ F21S 41/323 |
| 10,018,767 | B2 * | 7/2018 | Kawachi .............. G02B 6/0045 |
| 2004/0208019 | A1 | 10/2004 | Koizumi |
| 2005/0018147 | A1 | 1/2005 | Lee et al. |
| 2005/0259224 | A1 | 11/2005 | Lee et al. |
| 2006/0002131 | A1 | 1/2006 | Schultz et al. |
| 2007/0263383 | A1 * | 11/2007 | Ansems ................. G02B 6/002 362/231 |
| 2008/0158905 | A1 | 7/2008 | Chuang et al. |
| 2010/0085773 | A1 * | 4/2010 | Richardson .......... G02B 6/0036 362/615 |
| 2010/0321952 | A1 | 12/2010 | Coleman |
| 2012/0020066 | A1 | 1/2012 | Chang |
| 2012/0250346 | A1 | 10/2012 | Williams |
| 2012/0268966 | A1 | 10/2012 | McCollum |
| 2012/0287633 | A1 | 11/2012 | Kelly et al. |
| 2013/0039050 | A1 | 2/2013 | Dau et al. |
| 2013/0039090 | A1 | 2/2013 | Dau et al. |
| 2013/0208495 | A1 * | 8/2013 | Dau ...................... F21V 7/0008 362/551 |
| 2014/0160779 | A1 | 6/2014 | Pusch et al. |
| 2014/0334180 | A1 * | 11/2014 | Lin ...................... G02B 6/0055 362/606 |

FOREIGN PATENT DOCUMENTS

| | | |
|---|---|---|
| DE | 102013211868 A1 | 12/2014 |
| EP | 2161494 A1 | 3/2010 |
| EP | 2439564 A1 | 4/2012 |
| EP | 2778512 A1 | 9/2014 |
| EP | 2886937 A1 | 6/2015 |
| FR | 2934353 A1 | 1/2010 |
| JP | 2014229510 A | 12/2014 |
| WO | WO2002050590 A1 | 6/2002 |
| WO | WO2006064434 A1 | 6/2006 |
| WO | WO2007146373 A1 | 12/2007 |
| WO | WO2009099547 A1 | 8/2009 |
| WO | WO2010103450 A1 | 9/2010 |
| WO | WO2012059852 A1 | 5/2012 |
| WO | WO2015113979 A1 | 8/2015 |

OTHER PUBLICATIONS

European Application No. EP16 159 648.1, Communication pursuant to Article 94(3) EPC, dated Oct. 6, 2016, 5 pages.

European Application No. 17188348.1, European Search Report dated Dec. 8, 2017, 6 pages.

European Application No. 17188348.1, Communication pursuant to Article 94(3) EPC dated Dec. 21, 2017, 7 pages.

Notification of Transmittal of the International Search Report and the Written Opinion of the International Searching Authority, International Application No. PCT/US2014/047279, dated Dec. 12, 2014, 10 pages.

\* cited by examiner

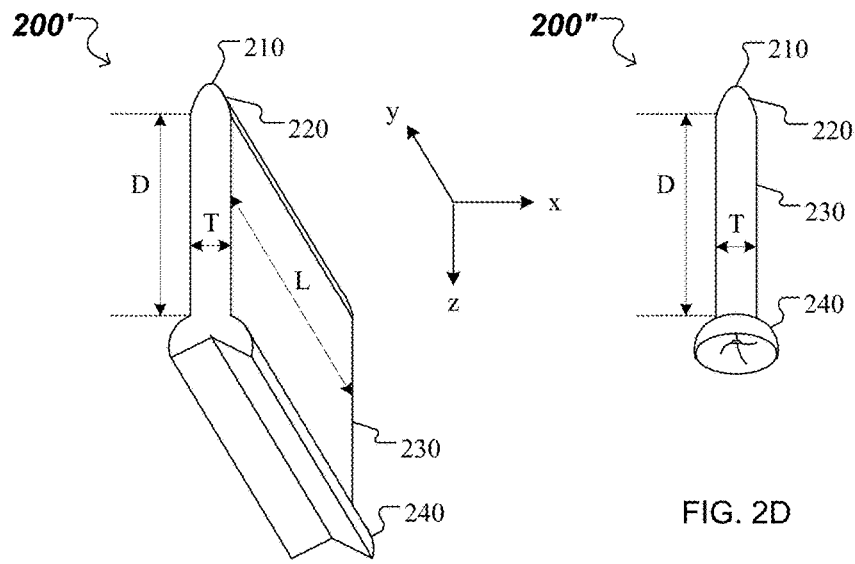
FIG. 2C
FIG. 2D
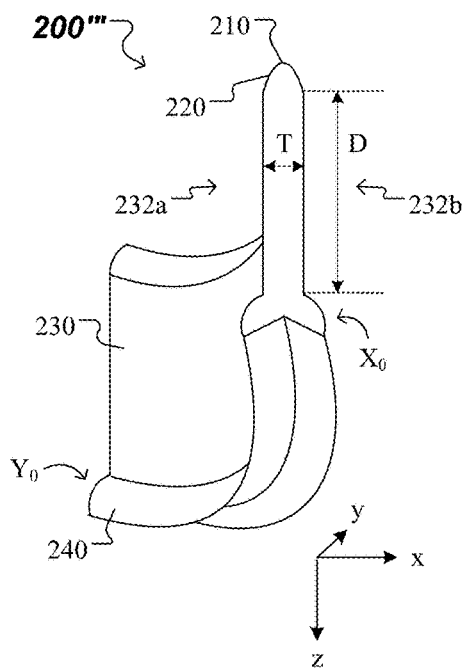
FIG. 2E
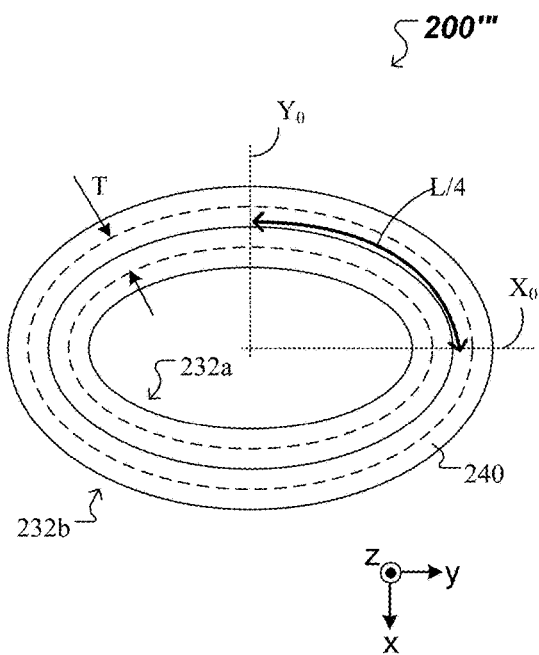
FIG. 2F

ILLUMINATION DEVICE HAVING A LIGHT GUIDE WITH LEAKY SIDE SURFACES

CROSS-REFERENCE TO RELATED APPLICATIONS

This application is a U.S. National Stage of International Application No. PCT/US2014/047279, filed Jul. 18, 2014, which claims benefit under 35 U.S.C. § 119(e)(1) of U.S. Provisional Application No. 61/856,009, filed on Jul. 18, 2013, the entire contents of which is incorporated by reference herein.

TECHNICAL FIELD

The present disclosure relates to illumination devices having a light guide with leaky side surfaces.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to illumination devices that include a light guide with leaky side surfaces.

In general, innovative aspects of the technologies described herein can be implemented in an illumination device that includes one or more of the following aspects:

In one aspect, an illumination device includes one or more light-emitting elements (LEEs) arranged to provide light; a light guide includes a receiving end and an opposing end, where the receiving end is arranged to receive the light provided by the LEEs. The light guide further includes a pair of opposing side surfaces extending along a length of the light guide between the receiving end and the opposing end, the light guide configured to (i) guide the received light in a forward direction, along the length of the light guide toward the opposing end of the light guide, and (ii) transmit a first portion of the guided light into ambient environment through one or more of the opposing side surfaces as sideways leaked light. Additionally, the illumination device further includes an optical extractor located at the opposing end and configured to output into the ambient environment a remaining portion of the guided light—that reaches the opposing end—as output light in backward directions.

The foregoing and other embodiments can each optionally include one or more of the following features, alone or in combination. In some implementations, the LEEs can be LEDs that emit white light.

In some implementations, the light guide can be tapered such that (i) a receiving aperture at the receiving end of the light guide is larger than an output aperture at the opposing end, (ii) an angle of incidence of guided light incident on the opposing side surfaces exceeds a critical angle beyond a predetermined distance from the receiving end, and (iii) some of the light guided beyond the predetermined distance transmits into the ambient environment through the opposing side surfaces as the sideways leaked light. In some cases, at least one of the opposing side surfaces can be planar. Moreover, both of the opposing side surfaces can be planar.

In some implementations, a portion of one of the opposing side surfaces can have a surface treatment that causes guided light incident on the side surface portion with the surface treatment to transmit into the ambient environment through the side surface portion as the sideways leaked light. For example, the surface treatment of the side surface portion can include embossed inclusions or facets. As another example, the surface treatment of the side surface portion can include cast inclusions or facets. As yet another example, the surface treatment of the side surface portion can include molded inclusions or facets. Moreover, the surface treatment of the side surface portion can include frustrated total internal reflection coatings. In some cases, the side surface portion with the surface treatment covers a predetermined fraction of an area of the side surface of the light guide. For instance, the predetermined fraction of the area of the side surface of the light guide can be between 5% and 50%. In some cases, the side surface portion with the surface treatment can be contiguous. In some cases, the side surface portion with the surface treatment can include one or more polygonal shapes. In some cases, the side surface portion with the surface treatment can represent text and/or symbols, such that the side surface of the light guide can provide signage.

In some implementations, the light guide is configured to guide the received light in a forward direction through total internal reflection (TIR) off the opposing side surfaces. In some implementations, the light provided by the LEEs can be in a first angular range, and a numerical aperture of the light guide is such that the light received from the LEEs in the first angular range can be guided by the light guide through TIR off the pair of opposing side surfaces.

In other implementations the luminaire module further includes one or more optical couplers. Here, the light provided by the LEEs can be in a first angular range, and the optical couplers can be arranged to receive the light provided by the LEEs and redirect it to the receiving end of the light guide in a second angular range. Additionally, a numerical aperture of the light guide is such that the light received from the optical couplers in the second angular range can be guided by the light guide through TIR off the pair of opposing side surfaces.

In some implementations, the optical extractor includes at least one redirecting surface, the at least one redirecting surface of the optical extractor being adapted to reflect at least a portion of the guided light in a direction that has a component orthogonal to the forward direction.

In other implementations, the optical extractor includes a first redirecting surface adapted to reflect at least a portion of the guided light in a first direction that has a component orthogonal to the forward direction, and a second redirecting surface adapted to reflect at least a portion of the guided light in a second direction that has a component orthogonal to the forward direction and antiparallel to the first direction.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIGS. 2A-2F show aspects of example luminaire modules that include a light guide.

Reference numbers and designations in the various drawings indicate exemplary aspects, implementations of particular features of the present disclosure.

DETAILED DESCRIPTION

The present disclosure relates to illumination devices for providing direct and/or indirect illumination. The disclosed illumination devices can efficiently guide and distribute light emitted by solid-state light sources towards work surfaces and/or towards background regions. The light from the solid-state light sources is received at an input end of a light guide and guided to an output end thereof. A portion of the light distributed by the disclosed illumination devices is extracted from the output end of the light guide with an optical extractor coupled thereto and another portion of the distributed light leaks through side surfaces of the light guide.

(i) Illumination Device Having a Light Guide with Leaky Side Surfaces

Figure 1A:
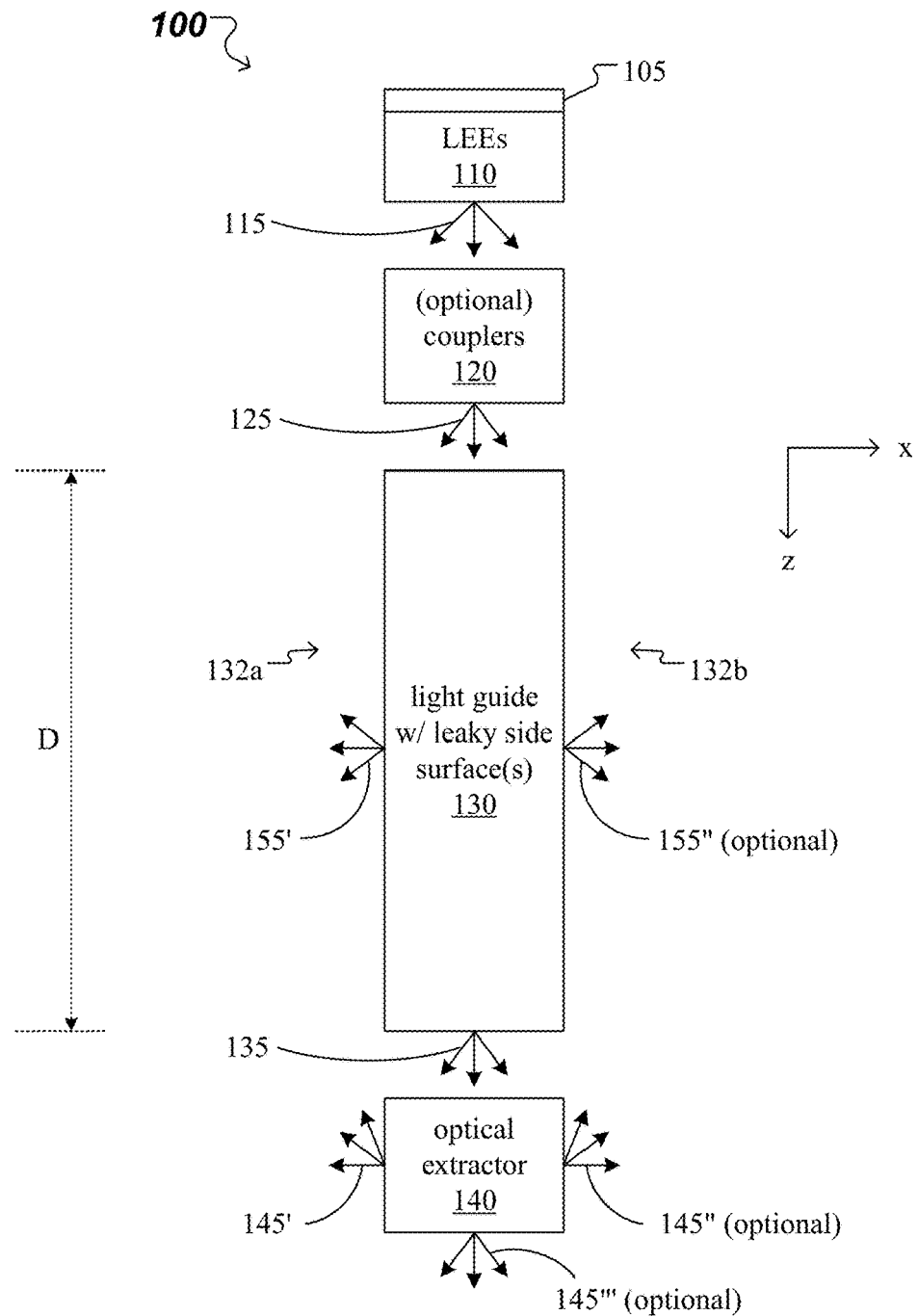
FIG. 1A shows an example of a luminaire module that includes a light guide with one or more leaky side surfaces.

FIG. 1A illustrates a block diagram of an illumination device 100 that includes a light guide 130 with one or more leaky side surfaces 132a, 132b. The illumination device 100, referred to as luminaire module 100, also includes a substrate 105, one or more light emitting elements (LEEs) 110 and an optical extractor 140. In some implementations, the illumination device 100 further includes one or more couplers 120.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have a Lambertian distribution relative to the optical axes of the one or more LEEs 110 (e.g., the z-axis of the Cartesian reference system shown in FIG. 1A.)

The light guide 130 is made from a solid, transparent material. The light guide 130 is arranged to receive the light provided by the LEEs 110 at one end of the light guide 130 and to guide the received light in a forward direction, e.g., along the z-axis, from the receiving end to an opposing end of the light guide 130. Here, a distance D between the receiving end of the light guide 130 and its opposing end can be 5, 10, 20, 50 or 100 cm, for instance. A combination of (i) an angular range in which the light is received by the light guide 130 at the receiving end and (ii) a numerical aperture of the light guide 130 is configured such that the received light is guided from the receiving end to the opposing end through reflection off of light guide side surfaces 132a, 132b of the light guide 130. Depending on the implementation, at least some, if not all, of this reflection is via total internal reflection (TIR). In some implementations, the numerical aperture of the light guide 130 is such that all light provided by the LEEs 110 in the angular range 115 can be injected directly into the light guide 130 at its receiving end.

In other implementations, the luminaire module 100 includes one or more couplers 120 to receive the light from the LEEs 110 within the first angular range 115 and provide light within a second angular range 125 to the receiving end of the light guide 130. The one or more couplers 120 are shaped to transform the first angular range 115 into the second angular range 125 via total internal reflection, specular reflection or both. As such, the one or more couplers 120 can include a solid transparent material for propagating light from an input end to an output end of each of the one or more couplers 120. Here, the divergence of the second angular range 125 is smaller than the divergence of the first angular range 115, such that all light provided by the couplers 120 in the angular range 125 can be injected into the light guide 130 at its receiving end. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. (See, e.g., FIG. 1B, 3D or 4C.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

One or more of the light guide side surfaces 132a, 132b can be planar, curved or otherwise shaped. The light guide side surfaces 132a, 132b can be parallel or non-parallel. In embodiments with non-parallel light guide side surfaces 132a, 132b (e.g., illustrated in FIGS. 3A-3B), a third angular range 135 of the guided light at the opposing end of the light guide 130 is different than the angular range 115 (when the light guide 130 receives the light directly from the LEEs 110) or 125 (when the light guide 130 receives the light from the couplers 120) of the light received at the receiving end. Here, the light guide side surfaces 132a, 132b are optically smooth to allow for most of the guided light to propagate forward (e.g., in the positive direction of the z-axis) inside the light guide 130 through TIR. In this case, the light guide side surfaces 132a, 132b are shaped and arranged with respect to the z-axis and each other such that a fraction of the guided light impinges on the light guide side surfaces 132a, 132b at incident angles larger than a critical angle. This fraction of the guided light is output into the ambient environment through one or more portions of the light guide side surface 132a in a first leaked angular range 155' and through the light guide side surface 132b in a second leaked angular range 155". Directions of propagation of the leaked light corresponding to the first 155' and second 155" leaked angular ranges and locations of the portions of the light guide side surfaces 132a, 132b through which the leaked light is output from the light guide 130 are designed based on the shape and relative arrangement of the light guide side surfaces 132a, 132b, as described in detail below in connection with FIGS. 3A-3D.

In embodiments with parallel light guide side surfaces 132a, 132b (e.g., illustrated in FIGS. 4A-4B), the third angular range 135 of the guided light at the opposing end of the light guide 130 has at least substantially the same divergence as the angular range 115 (when the light guide 130 receives the light directly from the LEEs 110) or 125 (when the light guide 130 receives the light directly from the couplers 120) of the light received at the receiving end. Here, most the light guide side surfaces 132a, 132b are optically smooth to allow for the guided light to propagate inside the light guide 130 through TIR. In this case, one or more portions of the light guide side surface 132a are altered to frustrate the TIR and to direct a fraction of the guided light outside of the light guide 130 through the altered portions. This fraction of the guided light is output into the ambient environment through the altered portions of the light guide side surface 132a in a first leaked angular range 155'. Optionally, one or more portions of the light guide side surface 132b also are altered to frustrate the TIR and to direct the fraction of the guided light outside of the light guide 130 through the altered portions of both light guide side surfaces 132a, 132b. In this case, this fraction of the guided light is output into the ambient environment through the altered portion(s) of the light guide side surface 132a in the first leaked angular range 155' and through the altered portion(s) of the light guide side surface 132b in a second leaked angular range 155". Directions of propagation of the leaked light corresponding to the first 155' and second 155" leaked angular ranges are designed based on scattering properties of the altered portions of the light guide side surfaces 132a, 132b, as described in detail below in connection with FIGS. 4A-4C.

Additionally, the length D of the light guide 130 (along the z-axis), a width L (along the y-axis) and a thickness T (along the z-axis) are designed to homogenize the light emitted by the discrete LEEs 110—which are distributed along the y-axis—as it is guided from the receiving end to the opposing end of the light guide 130. In this manner, the homogenizing of the emitted light—as it is guided through the light guide 130—causes a change of a discrete profile along the y-axis of the first angular range 115 (when the light guide 130 receives the light directly from the LEEs 110) or the second angular range 125 (when the light guide 130 receives the light from the couplers 120) to a continuous profile along the y-axis of the third angular range 135 in which the discrete profile is partially or fully blurred.

The optical extractor 140 outputs into the ambient environment the light received from the light guide 130 in one or more output illumination distributions. As such, the light output by the extractor 140 has a first output angular range 145' that can be substantially continuous along the y-axis and has a first output propagation direction with a component opposite to the forward direction (e.g., antiparallel to the z-axis.) In some implementations, the light output by the extractor 140 has, in addition to the first output angular range 145', a second output angular range 145" that is substantially continuous along the y-axis and has a second output propagation direction with a component opposite to the forward direction (e.g., antiparallel to the z-axis.) In this case, the first output propagation direction and the second output propagation direction have respective components orthogonal to the forward direction that are opposite (antiparallel) to each other (antiparallel and parallel to the x-axis.) In some implementations, the light output by the extractor 140 has, in addition to the first output angular range 145' and the second output angular range 145", a third output angular range 145'" that can be substantially continuous along the y-axis and has a third output propagation direction along the forward direction (e.g., along the z-axis.)

As described above, the light guide 130 and the optical extractor 140 of illumination device 100 are arranged and configured to translate and redirect light emitted by LEEs 110 away from the LEEs before the light is output into the ambient environment. The spatial separation of the place of generation of the light, also referred to as the physical (light) source, from the place of extraction of the light, also referred to as a virtual light source or a virtual filament, can facilitate design of the illumination device 100. In this manner, a virtual filament can be configured to provide substantially non-isotropic light emission with respect to planes parallel to an optical axis of the illumination device (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 110, with their predetermined optical, thermal, electrical and mechanical constraints, from the place of light extraction, may facilitate a greater degree of design freedom of the illumination device 100 and allows for an extended optical path, which can permit a predetermined level of light mixing before light is output from the illumination device 100.

Figure 1B:
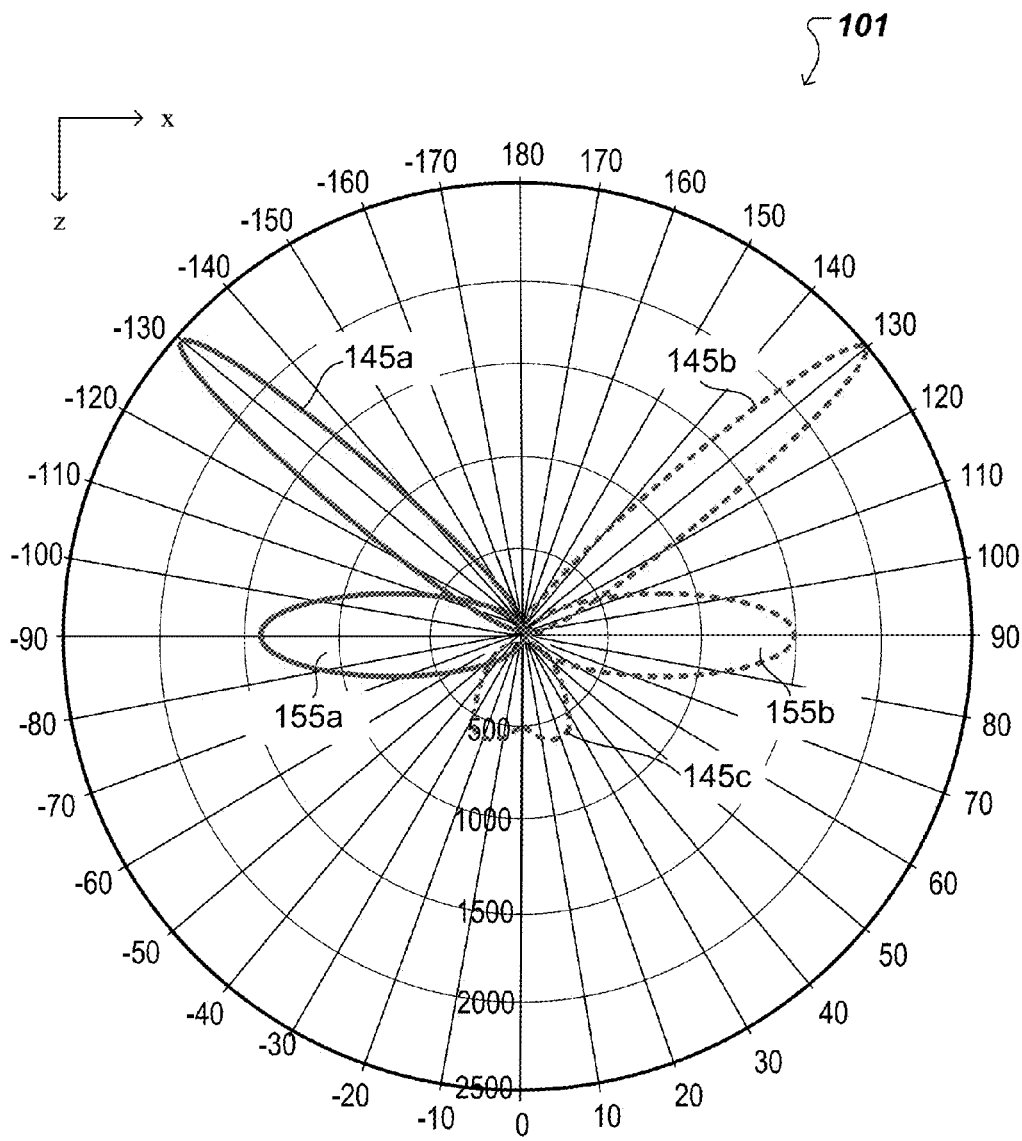
FIG. 1B is an intensity profile of the luminaire module shown in FIG. 1A.

FIG. 1B shows an x-z cross-section of far-field light intensity profile 101 of the illumination device 100 that is elongated along the y-axis (perpendicular to the sectional plane of FIG. 1A). In some implementations, the far-field light intensity profile 101 includes a first output lobe 145a representing light output by the illumination device 100 in the first output angular range 145' and a first leaked lobe 155a representing light output by the illumination device 100 in the first leaked angular range 155'. In this case, a propagation direction of the first output angular range 145' is along the about −130° bisector of the first output lobe 145a, and a propagation direction of the first leaked angular range 155' is along the about −90° bisector of the first leaked lobe 155a. Further in this case, a divergence of the first output angular range 145' (represented by a width of the first output lobe 145a) is smaller than a divergence of the first leaked angular range 155' (represented by a width of the first leaked lobe 155a).

In some implementations, in addition to the first output lobe 145a and the first leaked lobe 155a, the far-field light intensity profile 101 includes one or more of a second output lobe 145b representing light output by the illumination device 100 in the second output angular range 145", a third output lobe 145c representing light output by the illumination device 100 in the third output angular range 145''', or a second leaked lobe 155b representing light output by the illumination device 100 in the second leaked angular range 155''. In this case, a propagation direction of the second output angular range 145'' is along the about +130° bisector of the second output lobe 145b, a propagation direction of the third output angular range 145''' is along the about 0° bisector of the third output lobe 145c and a propagation direction of the second leaked angular range 155' is along the −90° bisector of the first leaked lobe 155a. Further in this case, a divergence of the second output angular range 145'' (represented by a width of the second output lobe 145b) is smaller than either of divergences of the third output angular range 145''' (represented by a width of the third output lobe 145c) or the second leaked angular range 155'' (represented by a width of the second leaked lobe 155b).

As described in detail below, composition and geometry of the couplers 120, the light guide 130 and the extractor 140 of the illumination device 100 can affect the far-field light intensity profile 101, e.g., the propagation direction and divergence associated with the first output lobe 145a and the first leaked lobe 155a, and, optionally, of the one or more of the second 145b and 145c output lobes or the second leaked lobe 155b.

Prior to describing details of various embodiments of the illumination device 100 that are configured with leaky light guides, a light guide illumination device is described for which the light guide guides light from the receiving end to the opposing end without leaking light through its side surfaces.

(ii) Luminaire Module Having a Light Guide without Leaky Side Surfaces

Figure 2A:
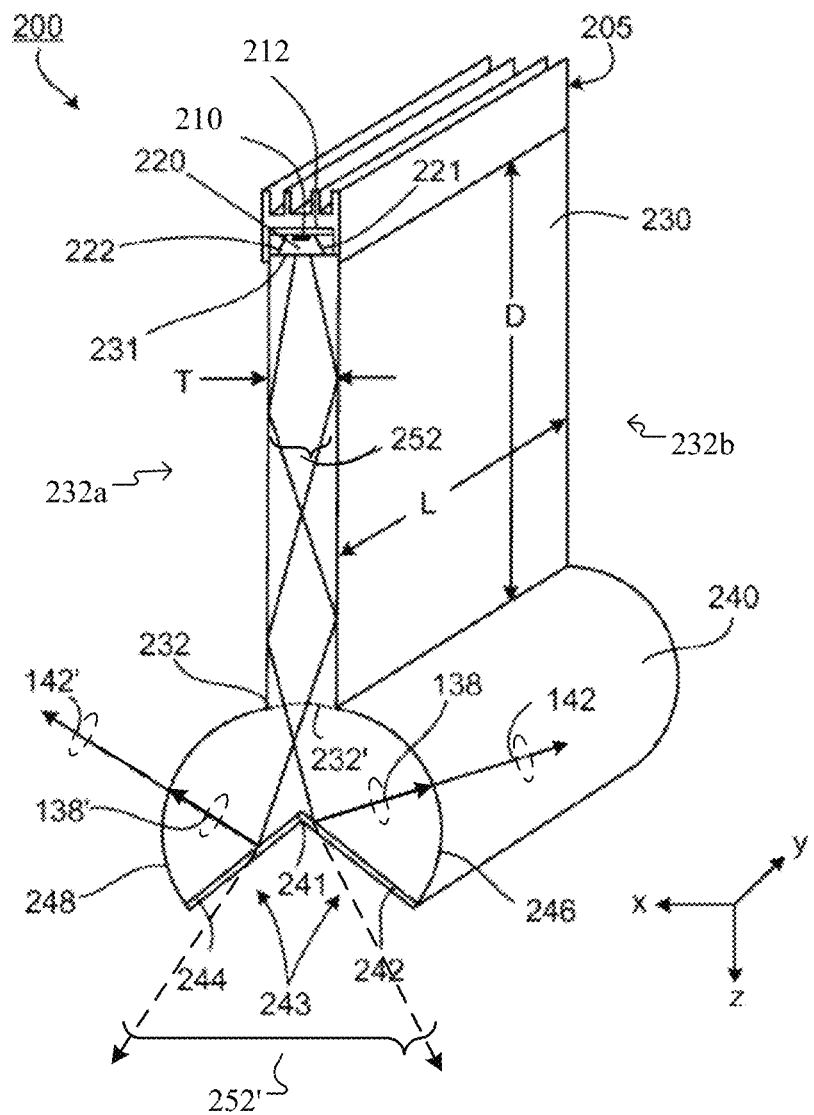

Referring to FIG. 2A, in which a Cartesian coordinate system is shown for reference, a luminaire module 200 includes a mount 212 having a plurality of LEEs 210 distributed along a first surface of the mount 212. The mount with the LEEs 210 is disposed at a first (e.g., upper) edge 231 of a light guide 230. Once again, the positive z-direction is referred to as the "forward" direction and the negative z-direction is the "backward" direction. Sections through the luminaire module 200 parallel to the x-z plane are referred to as the "cross-section" or "cross-sectional plane" of the luminaire module. Also, luminaire module 200 extends along the y-direction, so this direction is referred to as the "longitudinal" direction of the luminaire module. Implementations of luminaire modules can have a plane of symmetry parallel to the y-z plane, be curved or otherwise shaped. This is referred to as the "symmetry plane" of the luminaire module.

Multiple LEEs 210 are disposed on the first surface of the mount 212, although only one of the multiple LEEs 210 is shown in FIG. 2A. For example, the plurality of LEEs 210 can include multiple white LEDs. The LEEs 210 are optically coupled with one or more optical couplers 220 (only one of which is shown in FIG. 2A). An optical extractor 240 is disposed at second (e.g., lower) edge 232 of light guide 230.

Mount 212, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the mount 212 will generally depend, inter alia, on the length L, where more LEEs are used for longer luminaire modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 200 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. In some implementations, a heat-sink 205 can be attached to the mount 212 to extract heat emitted by the plurality of LEEs 210. The heat-sink 205 can be disposed on a surface of the mount 212 opposing the side of the mount 212 on which the LEEs 210 are disposed. The luminaire module 200 can include one or multiple types of LEEs, for example one or more subsets of LEEs in which each subset can have different color or color temperature.

Optical coupler 220 includes one or more solid pieces of transparent optical material (e.g., a glass material or a transparent organic plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent organic plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 252) reflects off the planar surfaces of the light guide by TIR and spatially mixes within the light guide. The mixing can help achieve illuminance and/or color uniformity, along the y-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor.

Optical extractor 240 is also composed of a solid piece of transparent optical material (e.g., a glass material or a transparent organic plastic, such as polycarbonate or acrylic) that can be the same as or different from the material forming light guide 230. In the example implementation shown in FIG. 2A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 252 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. As such, some light is transmitted in the forward direction (along the z-axis) through surfaces 242 and 244 of the optical extractor 240 in an output angular range 252'. In some cases, the light transmitted in the output angular range is refracted. In this way, the redirecting surface 243 acts as a beam splitter rather than a mirror, and transmits in the output angular range 252' a desired portion of incident light, while reflecting the remaining light in angular ranges 138 and 138'.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 200 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 200 corresponds to the emission spectrum of the LEEs 210. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n^2)^{(-1/2)}$, where R is the radius of curvature of the light-exit surfaces (246 and 248 in FIG. 2A) of the extractor 240 and n is the index of refraction of the portion of the extractor that is opposite of the wavelength-conversion material as viewed from the reflective surfaces (242 and 244 in FIG. 2A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138 towards the output surface 246, the second portion of the redirecting surface 244 provides light having an angular distribution 138' towards the output surface 246. The light exits optical extractor through output surfaces 246 and 248. In general, the output surfaces 246 and 248 have optical power, to redirect the light exiting the optical extractor 240 in angular ranges 142 and 142', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the luminaire module 200 is attached to a ceiling of a room (e.g., the forward direction is towards the floor) such configurations can help avoid glare and an appearance of non-uniform illuminance.

In general, the light intensity distribution provided by luminaire module 200 reflects the symmetry of the luminaire module's structure about the y-z plane. For example, referring to FIG. 1B, light output in angular range 142' corresponds to the first output lobe 145a of the far-field light intensity distribution 101, light output in angular range 142 corresponds to the second output lobe 145b of the far-field light intensity distribution 101 and light output (leaked) in angular range 252' corresponds to the third output lobe 145c of the far-field light intensity distribution 101. In general, an intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the output first 145a and second 145b lobes in the far-field light intensity profile 101. Additionally, a ratio of an amount of light in the combination of first 145a and second 145b output lobes and light in the third output lobe 145c is controlled by reflectivity and transmissivity of the redirecting surfaces 242 and 244. For example, for a reflectivity of 90% and transmissivity of 10% of the redirecting surfaces 242, 244, 45% of light can be output in the output angular range 142' corresponding to the first output lobe 142a, 45% light can be output in the output angular range 142 corresponding to the second output lobe 142b, and 10% of light can be output in the output angular range 252' corresponding to the third output lobe 142c.

In some implementations, the orientation of the output lobes 145a, 145b can be adjusted based on the included angle of the v-shaped groove 241 formed by the portions of the redirecting surface 242 and 244. For example, a first included angle results in a far-field light intensity distribution 101 with output lobes 145a, 145b located at relatively smaller angles compared to output lobes 145a, 145b of the far-field light intensity distribution 101 that results for a second included angle larger than the first angle. In this manner, light can be extracted from the luminaire module 200 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145a, 145b. Depending of the divergence of the angular range 252 of the light that is received at the input end of the optical extractor 232', concave reflective surfaces 242, 244 can narrow the lobes 145a, 145b output by the optical extractor 240 (and illustrated in FIG. 1B), while convex reflective surfaces 242, 244 can widen the lobes 145a, 145b output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to output light into different output angular ranges 142, 142' from those shown in FIG. 2A. In some implementations, illumination devices can output light into lobes 145a, 145b that have a different divergence or propagation direction than those shown in FIG. 1B. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 1B. The "direction" refers to the direction at which a lobe is brightest. In FIG. 1B, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The luminaire modules can include other features useful for tailoring the intensity profile. For example, in some implementations, luminaire modules can include an optically diffuse material that can diffuse light in a controlled manner to aid homogenizing the luminaire module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on surface of the circular structure and has an angle of incidence less than the critical angle and will exit circular structure without experiencing TIR. Light rays propagating within spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n^2)^{(-1/2)}$, which is smaller than R/n, will be subject to small Fresnel reflection at the surface of radius R when exiting the circular structure. This condition may be referred to as Brewster geometry. Implementations may be configured accordingly.

Referring again to FIG. 2A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 242 and 244 exits through surfaces 246 and 248, respectively, without experiencing TIR.

Figure 2B:
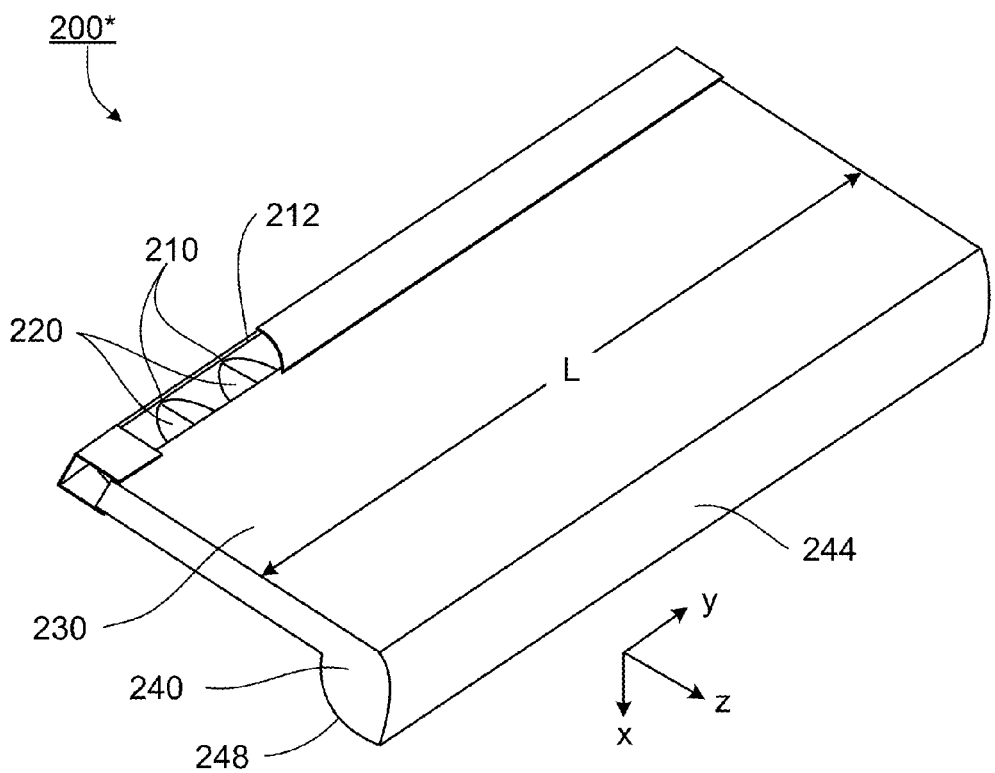

In the example implementations described above in connection with FIG. 2A, the luminaire module 200 is configured to output light into output angular ranges 142 and 142'. In other implementations (e.g., see FIG. 2B), the light guide-based luminaire module 200 is modified to output light into a single output angular range 142'. Such light guide-based luminaire module configured to output light on a single side of the light guide is referred to as a single-sided luminaire module and is denoted 200*. The single-sided luminaire module 200* is elongated along the y-axis like the luminaire module 200 shown in FIG. 2A. Also like the luminaire module 200, the single-sided luminaire module 200* includes a mount 212 and LEEs 210 disposed on a surface of the mount 212 along the y-axis to emit light in a first angular range. The single-sided luminaire module 200* further includes optical couplers 220 arranged and configured to redirect the light emitted by the LEEs 210 in the first angular range into a second angular range 252 that has a divergence smaller than the divergence of the first angular range at least in the x-z cross-section. Also, the single-sided luminaire module 200* includes a light guide 230 to guide the light redirected by the optical couplers 220 in the second angular range 252 from a first end 231 of the light guide to a second end 232 of the light guide. Additionally, the single-sided luminaire module 200* includes a single-sided extractor (denoted 240') to receive the light guided by the light guide 230. The single-sided extractor 240' includes a redirecting surface 244 to redirect the light received from the light guide 230 into a third angular range 138', like described for luminaire module 200 with reference to FIG. 2A, and an output surface 248 to output the light redirected by the redirecting surface 244 in the third angular range 138' into a fourth angular range 142'.

A light intensity profile of the single-sided luminaire module 200* is represented in FIG. 1B as a single output lobe 145a. The single output lobe 145a corresponds to light output by the single-sided luminaire module 200* in the fourth angular range 142'.

FIG. 2C shows an embodiment 200' of the luminaire module 200 that also is elongated along an axis (e.g., y-axis) perpendicular to the forward direction (e.g., along the z-axis.) In this case, a length L of the light guide 230 along the elongated dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05D, 0.1D or 0.2D, for instance, light from multiple, point-like LEEs 210—distributed along the elongated dimension L—that is edge-coupled into the light guide 230 at the receiving end can efficiently mix and become uniform (quasi-continuous) along the y-axis by the time it propagates to the opposing end.

FIG. 2D shows a luminaire module 200" that has (e.g., continuous or discrete) rotational symmetry about the forward direction (e.g., z-axis.) Here, a diameter T of the light guide 230 is a fraction of the distance D traveled by the guided light from the receiving end to the opposing end of the light guide 230. For example, the diameter of the light guide 230 can be T=0.05D, 0.1D or 0.2D, for instance.

Other open and closed shapes of the luminaire module 200 are possible. FIGS. 2E and 2F show a perspective view and a bottom view, respectively, of a luminaire module 200''' for which the light guide 230 has two opposing side surfaces 232a, 232b that form a closed cylinder shell of thickness T. In the example illustrated in FIGS. 2E and 2F, the x-y cross-section of the cylinder shell formed by the opposing side surfaces 232a, 232b is oval. In other cases, the x-y cross-section of the cylinder shell can be circular or can have other shapes. Some implementations of the example luminaire module 200''' may include a specular reflective coating on the side surface 232a of the light guide 230. For T=0.05D, 0.1D or 0.2D, for instance, light from multiple, point-like LEEs 210—distributed along an elliptical path of length L—that is edge-coupled into the light guide 230 at the receiving end can efficiently mix and become uniform (quasi-continuous) along such an elliptical path by the time it propagates to the opposing end.

Luminaire modules like the ones described in this section—which have a light guide 230 that guides light from its input end 231 to its output end 232 without leaking light through its side surfaces 232a and 232b—can be used to obtain luminaire modules with leaky side surfaces, as described in the following sections.

(iii) Illumination Device Having Tapered Light Guide

Figure 3A:
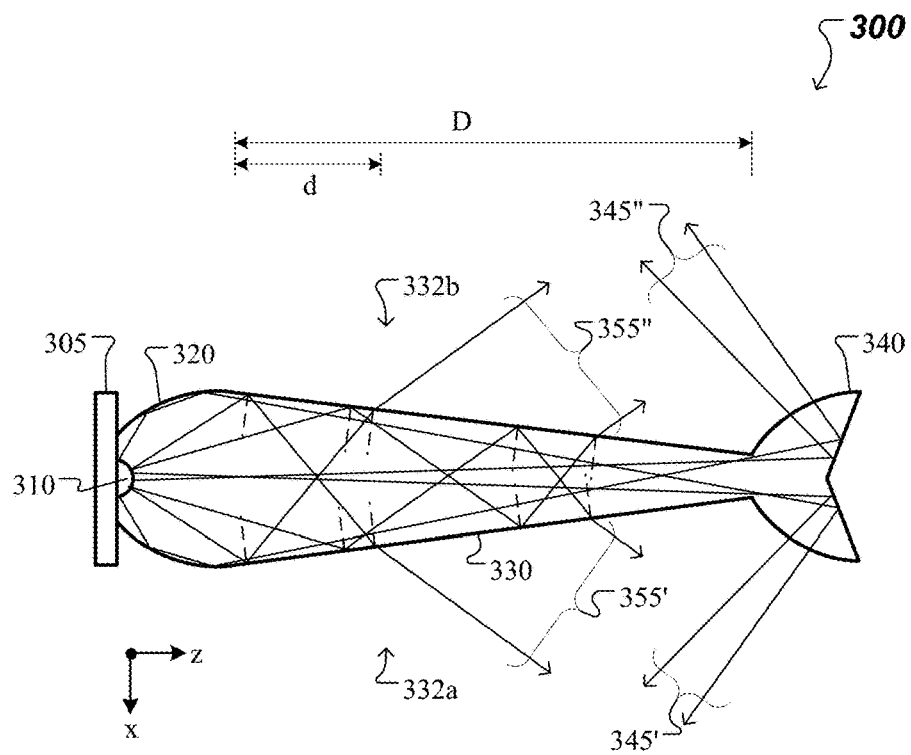
FIGS. 3A-3D show aspects of an example of a luminaire module that includes a light guide with one or more leaky side surfaces.
Figure 3B:
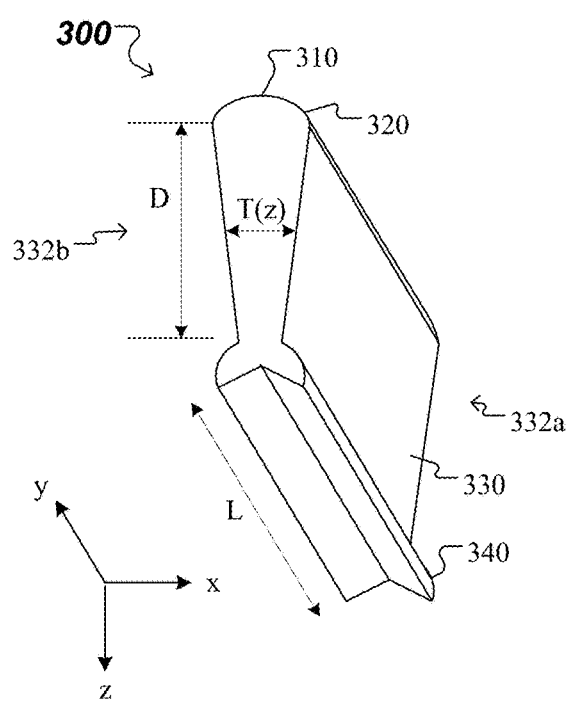

FIGS. 3A-3B show aspects of an illumination device 300 that includes a tapered light guide 330. Here, the tapered light guide 330 is configured to leak a desired amount of light through its side surfaces 332a and 332b. In this example, the illumination device 300 also includes LEEs 310, one or more corresponding couplers 320 and an optical extractor 340. In the example illustrated in FIG. 3B, the illumination device 300 has an elongated configuration, e.g., with a longitudinal dimension L along the y-axis, perpendicular to the page. In this case, L can be 1', 2' or 4', for instance. In other implementations, the illumination device 300 can have another elongated configuration, as illustrated in FIGS. 2E-2F. In some other implementations, the illumination device 300 can have a non-elongated configuration, e.g., with rotational symmetry around the z-axis, as illustrated in FIG. 2D.

The tapered light guide 330 can be obtained by shaping the side surfaces 232a and 232b of the light guide 230 described above in connection with FIG. 2A and arranging them with respect to each other as shown in FIG. 3A. Here, the light guide 330 has a length D along the z-axis, e.g., D=10, 20, 50 cm, from a receiving end to an opposing end.

A thickness T(z) of the light guide 330 along the x-axis is a function of distance from the receiving end, such that the thickness T(z=0) of the light guide at the receiving end, at z=0, is larger than the thickness T(z=D) of the light guide at the opposing end, z=D: T(D)>T(0). For example, T(0)≈10% D or 20% D, and T(D)≈5% D. Here, the light guide 330 is made from a solid, transparent material. Additionally, the side surfaces 332a, 332b are optically smooth to allow for the guided light to propagate inside the light guide 330 through TIR, at least for a distance d<D—from the receiving end, along the z-axis—over which the guided light impinges on the side surfaces 332a, 332b at incidence angles that exceed a critical angle θc.

In the example implementation shown in FIGS. 3A-3B, a profile of the side surfaces 332a and 332b includes respective straight lines. In other implementations, a profile of the side surfaces 332a and 332b includes respective parabolic or hyperbolic curves, or other shapes.

Moreover, the optical extractor 340 has a structure similar to a structure of the extractor 240 of the luminaire module 200 described above in connection with FIG. 2A.

During operation, the LEEs 310 emit light within a first angular range 115 relative to the z-axis. The one or more couplers 320 are configured to receive the light from the LEEs 310 within the first angular range 115 and provide light within a second angular range 125 to the light guide 330. The one or more couplers 320 can be configured to transform the first angular range 115 into the second angular range 125 via total internal reflection, specular reflection or both. Here, the divergence of the second angular range 125 is smaller than the divergence of the first angular range 115, such that the combination (i) of the second angular range 125 and (ii) a numerical aperture of the light guide 330 is chosen to allow for the light received from the one or more couplers 320 at the receiving end of the light guide 330 to propagate at least over a distance d<D of the light guide 330, for example, via TIR.

Figure 3C:
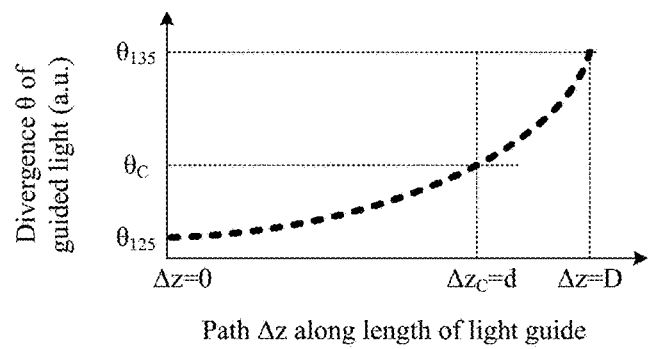

As the thickness T(z) of the light guide 330 along the x-axis decreases as a function of distance from the receiving end, the guided light impinges on the side surfaces 332a, 332b of the light guide 330 at successively larger incident angles for successive bounces off the side surfaces 332a, 332b, or equivalently, divergence of an angular range of the guided light increases along the length D of the light guide 330 as shown in FIG. 3C. Here, the divergence of the guided light increases from a divergence of the second angular range 125 of light received from the one or more couplers 320 at the receiving end to a divergence of the third angular range 135 provided by the light guide 330 at the opposing end. When, at z=d, a divergence of the angular range of the guided light exceeds a critical value θc, a fraction of the guided light is transmitted (leaks) through the side surfaces 332a and 332b as sideways leaked light in leaked angular ranges 355' and 355", respectively. Referring to FIG. 3A, a direction of propagation of light in the first leaked angular range 355' has a component in the forward direction (parallel with the z-axis) and another component parallel with the x-axis. Further, a direction of propagation of light in the second leaked angular range 355" has a component in the forward direction (parallel with the z-axis) and another component antiparallel with the x-axis.

Moreover, the remaining guided light is provided at the opposing end of the light guide 330 in the angular range 135 to the optical extractor 340. Here, the optical extractor 340 is arranged and configured to output light in first and second output angular ranges 345' and 345". In this example, a direction of propagation of light in the first output angular range 345' has a component in the backward direction (antiparallel with the z-axis) and another component to the left of the light guide 330 (parallel with the x-axis). Referring to FIG. 3A, a direction of propagation of light in the second output angular range 345" has a component in the backward direction (antiparallel with the z-axis) and another component antiparallel with the x-axis.

Figure 3D:
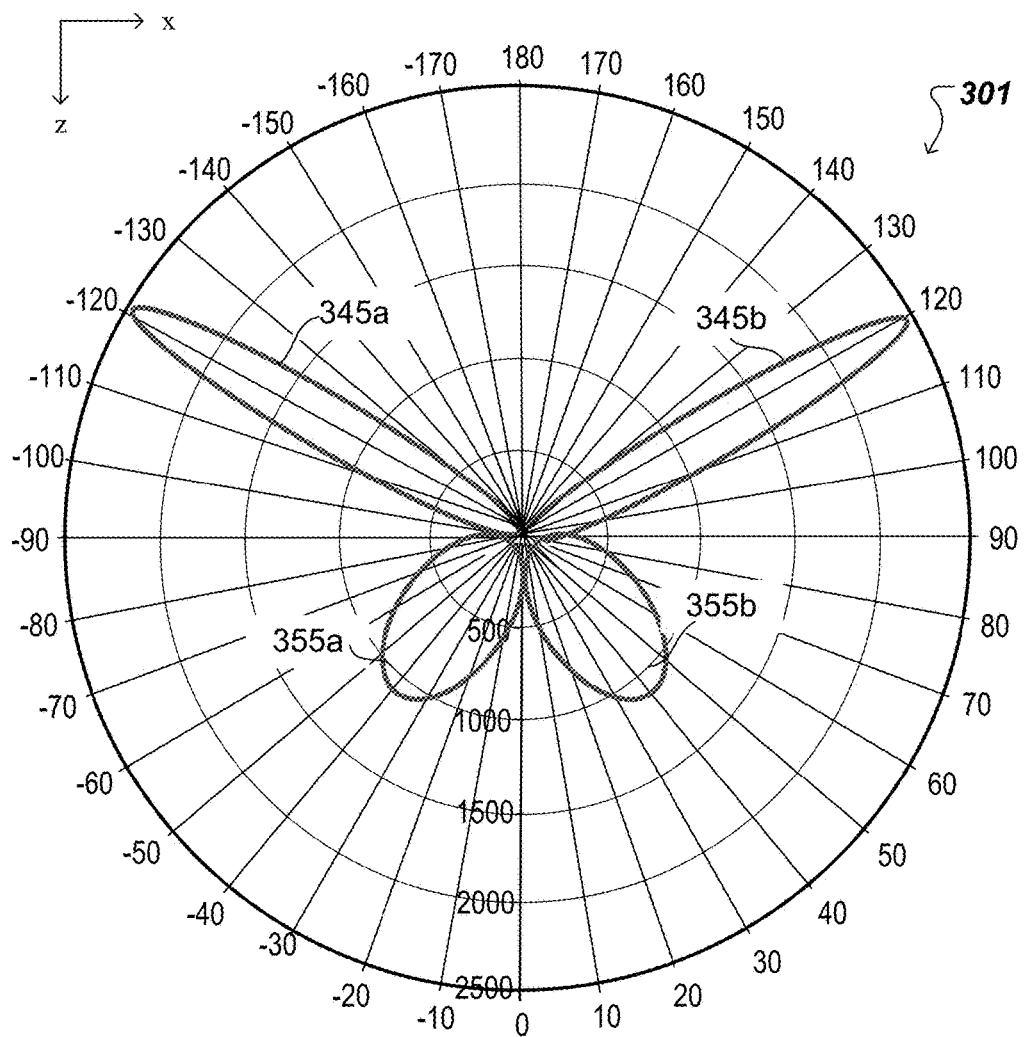

FIG. 3D shows a far-field intensity distribution 301 of light output by the illumination device 300 in the x-z cross-section. Here, the illumination device 300 is equipped with the tapered light guide 330. Output lobe 345a corresponds to light output by the optical extractor 340 in the first output angular range 345', and output lobe 345b corresponds to light output by the optical extractor 340 in the second output angular range 345". Leaked lobe 355a corresponds to light leaked by the light guide 330 through a first side surface 332a in the first leaked angular range 355', and leaked lobe 355b corresponds to light leaked by the light guide 330 through a second, opposing side surface 332b in the second leaked angular range 355".

The orientation of the output lobes 345a and 345b (e.g., with respect to the z-axis) and a shape of thereof (e.g., aspect ratios of the output lobes 345a and 345b) depends on (i) geometry of redirecting surfaces and output surfaces of the optical extractor 340 and (ii) a divergence of the third angular range 135 of the light provided by the light guide 330 to the optical extractor 340. In turn, the divergence of the third angular range 135 depends on (i) collimating characteristics of the one or more optical couplers 320, (ii) shape and relative arrangement of the side surfaces 332a, 332b of the light guide 330, and (iii) length along the z-axis of the light guide 330.

Additionally, a ratio of an amount of light in the combination of first 345a and second 345b output lobes and in the combination of first 355a and second 355b leaked lobes is controlled by a ratio d/D of (i) a distance "d" from the receiving end of the light guide 330 starting where a divergence of the guided light exceeds the critical angle θc and (ii) the length D of the light guide 330. For example, for a ratio d/D 80%, 40% of light received by the extractor 340 can be output in the output angular range 345' corresponding to the first output lobe 345a and 40% of light received by the extractor 340 can be output in the output angular range 345" corresponding to the second output lobe 345b. Additionally, 10% of guided light can be output in the first leaked angular range 355' corresponding to the first leaked lobe 355a, and 10% of guided light can be output in the first leaked angular range 355' corresponding to the first leaked lobe 355a.

In summary, the illumination device 300 utilizes at least a portion of the light guide 330 (e.g., the length D-d of the light guide) that feeds the optical extractor 340 for part of the illumination device 300's light emission properties. As is shown in FIGS. 3A-3B a coupler 320 and LEEs 310 are in optical communication with a light guide 330 that is tapered over at least a portion of its elongated extent (along the z-axis.) The second angular range 125 of light introduced into the light guide 330 may be fairly narrow and well within the requirements for substantially all light to be totally internally reflected within the light guide 330 if the side walls were parallel (as described above in connection with FIG. 2A.) However, as the walls of the light guide 330 are tapered down in the dominant direction of the introduced light (e.g., along the z-axis), each subsequent reflection on the side surfaces 332a, 332b will be gradually turned closer and closer to the critical angle such that light will eventually be allowed to escape the side surfaces 332a, 332b of the solid light guide 330. Such tapering of the light guide 330 could be useful for applications where it may be desirable to create an element of luminance from the side of the light guide 330. Furthermore, the use of holographic films or other prescribed optical sheet materials may provide additional steering or beam shaping of the light leaked through the sides 332a, 332b of light guide 330.

Based on a dependence (shown in FIG. 3C) of the divergence of the guided light as a function of distance travelled in the light guide 330 from the receiving end, at a certain length d it is possible to see a useful amount of light exiting (leaking) through the side walls 332a, 332b of the light guide 330. The amount of sideways leaked light, relative to the incident amount of guided light, gradually increases the further through the light guide 330 the light has traveled. This may provide a subtly changing emission from the light guide 330 that satisfies certain valuable lighting functions such as fill light near the ceiling or wall, or satisfies certain aesthetic requirements for some degree of "glow" emanating from the luminaire module 300 to balance light intensity in the field of view. As the guided light reaches the end of the light guide 330 and enters the optical extractor 340, it will also enter at a wider angular range 135 relative to the entry angular range 125, such that emission from the optical extractor 340 may be more dispersed than if the side walls of the light guide 330 were parallel (like in the luminaire module 200 described above in connection with FIG. 2A.) This wider angular range may also be desirable for certain lighting applications where surface luminance requirements are not as problematic such as in non-direct view lighting applications, e.g., architectural coves.

In this section, the luminaire module 200 was modified to obtain the illumination device 300 that leaks light through side surfaces 332a, 332b of its light guide 330. Here, the modification represents tapering the light guide 230 of the luminaire module 200 to obtain a tapered light guide 330. In embodiments described below, other modifications of the luminaire module 200 are described to obtain illumination devices that leak light through side surfaces of their light guide.

(iv) Illumination Device Having Light Guide with Partial Surface Treatment

Figure 4A:
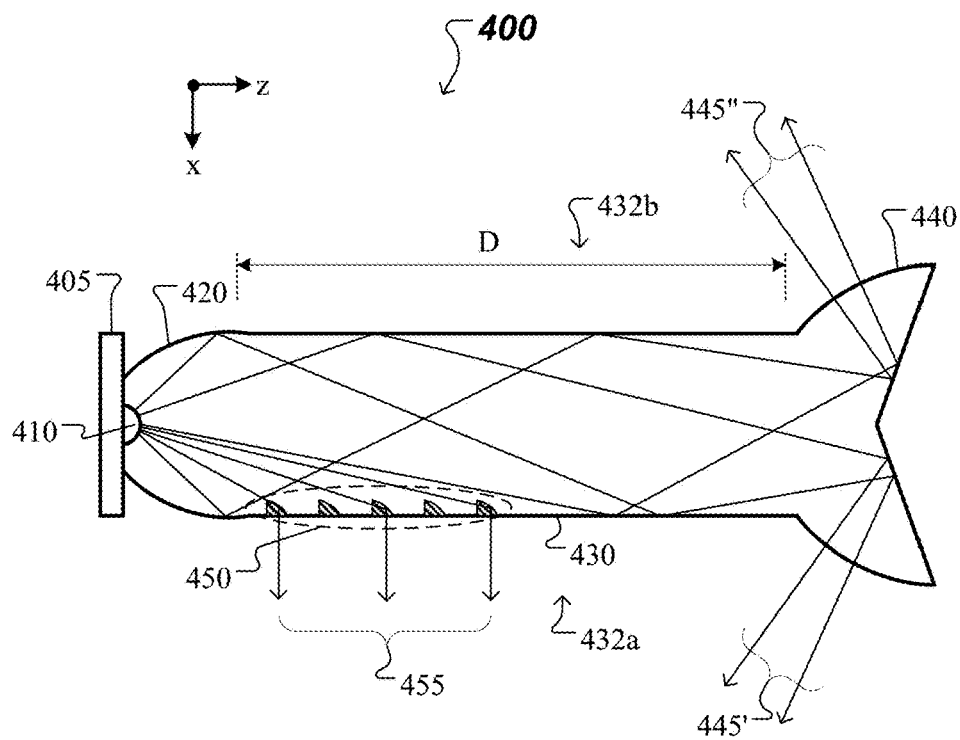
FIGS. 4A-4C show aspects of another example of a luminaire module that includes a light guide with one or more leaky side surfaces.
Figure 4B:
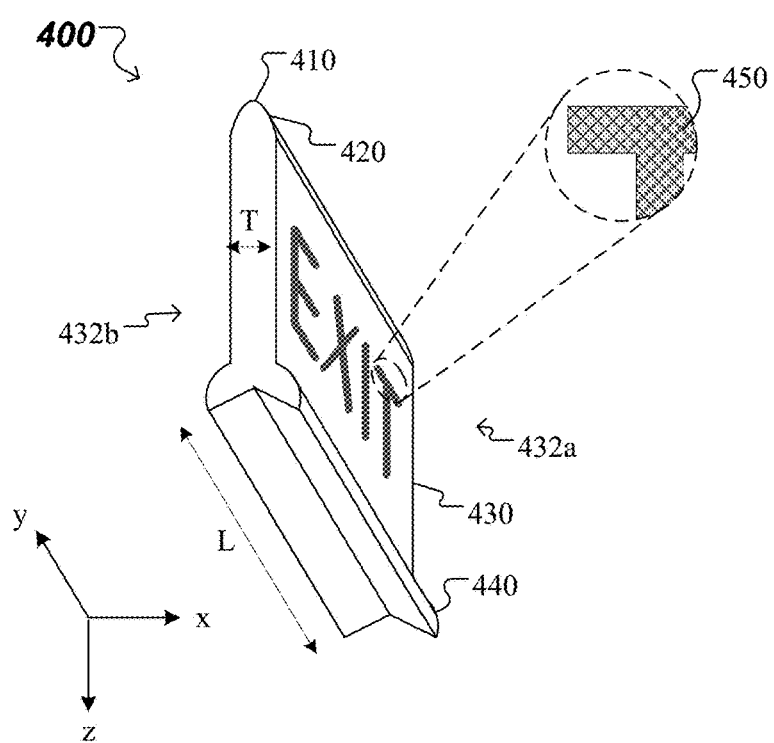
Figure 4C:
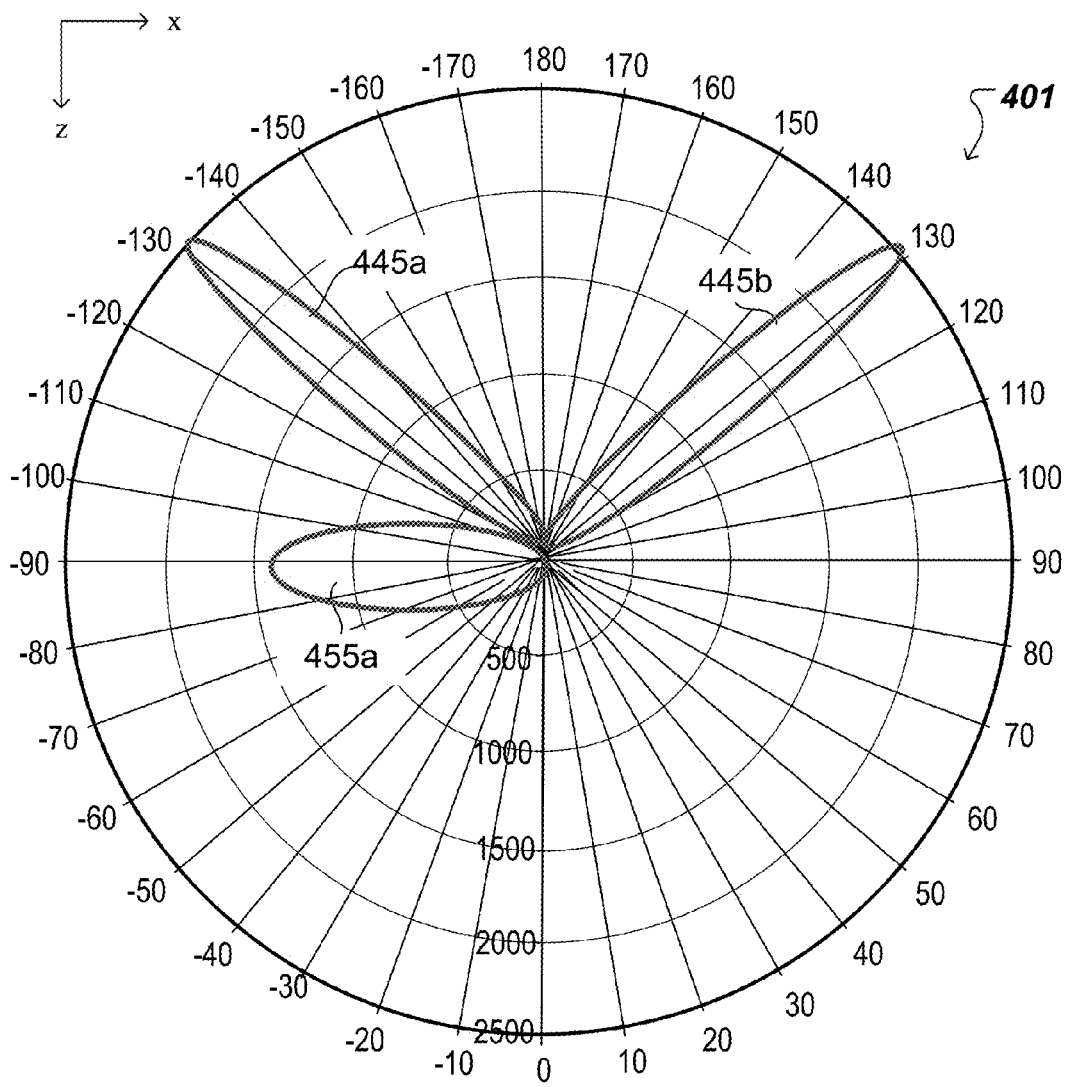

FIGS. 4A-4C show aspects of an illumination device 400 that includes a light guide 430 with surface treatment 450 that covers a portion of a first side surface 432a of the light guide 430, a portion of an opposing, second side surface 432b of the light guide 430, or portions of both side surfaces 432a, 432b. In this example, the illumination device 400 also includes LEEs 410, one or more corresponding couplers 420 and an optical extractor 440. In the example illustrated in FIG. 4B, the illumination device 400 has an elongated configuration, e.g., with a longitudinal dimension L along the y-axis, perpendicular to the page. In this case, L can be 1', 2' or 4', for instance. In other implementations, the illumination device 400 can have other elongated configuration, as illustrated in FIGS. 2E-2F. In some other implementations, the illumination device 400 can have a non-elongated configuration, e.g., with rotational symmetry around the z-axis, as illustrated in FIG. 2D.

In some implementations, different types of surface treatment 450 including embossed, cast and molded inclusions or facets can be integrated over regions of the side(s) 232a (232b) of the light guide 230 described above in connection with FIGS. 2A-2F to obtain the light guide 430 with partial surface treatment 450. In some implementations, frustrated total internal reflection coatings and other types of holographically reproduced surfaces with details down to the micron level can be overlaid over regions of the side(s) 232a (232b) of the light guide 230 described above in connection with FIGS. 2A-2F to obtain the light guide 430 with partial surface treatment 450. In either case, features of the surface treatment 450 are configured to create prescribed side emission patterns. The region(s) of the side surface 432a (or 432b) configured with the surface treatment 450 cover a fraction, e.g., 5%, 10%, 20% or 50%, of an area of the side surface 432a (or 432b). Further, the region(s) of the side surface 432a (or 432b) configured with the surface treatment 450 is located at a desired location on the side surface 432a (or 432b) with respect to the receiving end or the opposing end. Furthermore, the region(s) of the side surface 432a (or 432b) configured with the surface treatment 450 can be contiguous or discontinuous, and can have a shape that is polygonal, oval, etc. In the example illustrated in FIG. 4B, the region(s) of the side surface 432a (or 432b) configured with the surface treatment 450 represent signage on the side surface 432a (or 432b) of the light guide 430 of the luminaire module 400.

The light guide 430 has a length D>0 along the z-axis, e.g., D=10, 20, 50 cm, from a receiving end to an opposing end. A thickness T of the light guide 430 along the x-axis can be much smaller than the length D along the z-axis, e.g., T≈5% D, 10% D or 20% D. The light guide 430 is made from a solid, transparent material. Here, the side surfaces 432a, 432b are optically smooth (outside of the region(s) configured with the surface treatment 450) to allow for the guided light to propagate inside the light guide 430 through TIR.

Moreover, the optical extractor 440 has a structure similar to a structure of the extractor 240 of the luminaire module 200 described above in connection with FIG. 2A.

During operation, the LEEs 410 emit light within a first angular range 115 relative to the z-axis. The one or more couplers 420 are configured to receive the light from the LEEs 410 within the first angular range 115 and provide light within a second angular range 125 to the light guide 430. The one or more couplers 420 can be configured to transform the first angular range 115 into the second angular range 125 via total internal reflection, specular reflection or both. Here, the divergence of the second angular range 125 is smaller than the divergence of the first angular range 115, such that the combination (i) of the second angular range 125 and (ii) a numerical aperture of the light guide 430 is chosen to allow for the light received from the one or more couplers 420 at the receiving end of the light guide 430 to propagate to the opposing end of the light guide 430, for example, via TIR.

A fraction of the guided light that impinges on the region(s) of the side surface 432a of the light guide 430 configured with the surface treatment 450 is transmitted (leaks) through the region of the side surface 432a as sideways leaked light in a leaked angular range 455. In this example, a direction of propagation of light in the leaked angular range 455 is to the left of the light guide 430 (parallel with the x-axis). In another example (not illustrated in FIG. 4A), the direction of propagation of light in the leaked angular range 455 has a component in the forward direction (parallel with the z-axis). In yet another example (not illustrated in FIG. 4A), the direction of propagation of light in the leaked angular range 455 has a component in the backward direction (antiparallel with the z-axis).

Moreover, the remaining light received by the light guide 430 at the receiving end from the one or more couplers 420 in the second angular range 125 is guided forward (along the z-axis) by the light guide 430 from its receiving end to its opposing end. At the opposing end, the forward guided light has a third angular range 135. In some implementations, the third angular range 135 is substantially the same as the second angular range 125. At the opposing end, the optical extractor 440 is arranged and configured to output light in first and second output angular ranges 445' and 445". In this example, a direction of propagation of light in the first output angular range 445' has a component in the backward direction (antiparallel with the z-axis) and another component to the left of the light guide 430 (parallel with the x-axis). Further, a direction of propagation of light in the second output angular range 445" has a component in the backward direction (antiparallel with the z-axis) and another component to the right of the light guide 430 (antiparallel with the x-axis).

FIG. 4C shows a far-field intensity distribution 401 of light output by the illumination device 400 in the x-z cross-section. Here, the illumination device 400 is equipped with the light guide 430 having one or more regions of the side surface 432a configured with the surface treatment 450. Output lobe 445a corresponds to light output by the optical extractor 440 in the first output angular range 445', and output lobe 445b corresponds to light output by the optical extractor 440 in the second output angular range 445". Leaked lobe 455a corresponds to light leaked by the light guide 430 through a first side surface 432a in the leaked angular range 455.

Orientation of the output lobes 445a and 445b (e.g., with respect to the z-axis) and a shape of thereof (e.g., aspect ratios of the output lobes 445a and 445b) depends on (i) geometry of redirecting surfaces and output surfaces of the optical extractor 440 and (ii) a divergence of the third angular range 135 of the light provided by the light guide 430 to the optical extractor 440. In turn, the divergence of the third angular range 135 depends on (i) collimating characteristics of the one or more optical couplers 420.

Additionally, a ratio of an amount of light in the combination of first 445a and second 445b output lobes relative to leaked lobe 455a can be controlled by a ratio a/A of (i) an area "a" of the region(s) of the side surface 432a configured with the surface treatment 450 and (ii) an area "A" of the side surface 432a. For example, for a ratio a/A 20%, 40% of light received by the extractor 440 can be output in the output angular range 445' corresponding to the first output lobe 445a and 40% of light received by the extractor 440 can be output in the output angular range 445" corresponding to the second output lobe 445b. Additionally, 20% of guided light can be output in the leaked angular range 455 corresponding to the leaked lobe 455a.

In summary, the illumination device 400 utilizes surface treatment 450—which includes optical inclusions or patterns that are molded into the light guide 430—to create specific side emission profiles from one, or both, sides 432a, 432b of the light guide 430. This approach provides a directly controllable emission pattern from a side surface 432a (or 432b) of the light guide 430 that can be combined with the primary lighting functionality provided by the optical extractor 440 located at a distal end of the light guide 430. Emission patterns caused by the surface treatment 450 can then be combined with other functional patterns caused by the optical extractor 440 to create a highly structured surface luminance profile for the luminaire module 400. These luminance mappings of the surfaces of the luminaire module 400 are important since it is possible to create highly structured luminous bodies unlike any other light source technology currently in existence.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

The invention claimed is:

1. An illumination device comprising:
one or more light-emitting elements (LEEs) arranged to provide light;
a light guide comprising
a receiving end and an opposing end, the receiving end arranged to receive the light provided by the LEEs, and
a pair of opposing side surfaces extending along a length of the light guide between the receiving end and the opposing end, the light guide configured to
guide the received light in a forward direction, along the length of the light guide toward the opposing end of the light guide, and
transmit a first portion of the guided light into ambient environment through one or more of the opposing side surfaces as sideways leaked light; and
an optical extractor located at the opposing end and configured to output into the ambient environment a remaining portion of the guided light—that reaches the opposing end—as output light in backward directions,
wherein the light guide is tapered such that
a receiving aperture at the receiving end of the light guide is larger than an output aperture at the opposing end,
an angle of incidence of guided light incident on the opposing side surfaces exceeds a critical angle beyond a predetermined distance from the receiving end, and
some of the light guided beyond the predetermined distance transmits into the ambient environment through the opposing side surfaces as the sideways leaked light.

2. The illumination device of claim 1, wherein at least one of the opposing side surfaces is planar.

3. The illumination device of claim 2, wherein both of the opposing side surfaces are planar.

4. The illumination device of claim 1, wherein
the light provided by the LEEs is in a first angular range, and
a numerical aperture of the light guide is such that the light received from the LEEs in the first angular range can be guided by the light guide through TIR off the pair of opposing side surfaces.

5. The illumination device of claim 1 further comprising one or more optical couplers, wherein
the light provided by the LEEs is in a first angular range,
the optical couplers are arranged to receive the light provided by the LEEs and redirect it to the receiving end of the light guide in a second angular range, and
a numerical aperture of the light guide is such that the light received from the optical couplers in the second angular range can be guided by the light guide through TIR off the pair of opposing side surfaces.

6. The illumination device of claim 1, wherein the LEEs are LEDs that emit white light.

7. The illumination device of claim 1, wherein the optical extractor comprises at least one redirecting surface, the at least one redirecting surface of the optical extractor being adapted to reflect at least a portion of the guided light in a direction that has a component orthogonal to the forward direction.

8. The illumination device of claim 1, wherein the optical extractor comprises
a first redirecting surface adapted to reflect at least a portion of the guided light in a first direction that has a component orthogonal to the forward direction, and
a second redirecting surface adapted to reflect at least a portion of the guided light in a second direction that has a component orthogonal to the forward direction and antiparallel to the first direction.

* * * * *